United States Patent
Gustavsson et al.

(10) Patent No.: US 10,432,293 B2
(45) Date of Patent: Oct. 1, 2019

(54) WIRELESS COMMUNICATION NODE AND A METHOD FOR PROCESSING A SIGNAL IN SAID NODE

(71) Applicant: Telefonaktiebolaget LM Ericsson (publ), Stockholm (SE)

(72) Inventors: Ulf Gustavsson, Göteborg (SE); Sven Jacobsson, Göteborg (SE); Giuseppe Durisi, Göteborg (SE); Vimar Björk, Göteborg (SE); Mikael Coldrey, Borås (SE); Lars Sundström, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/550,168

(22) PCT Filed: Apr. 2, 2015

(86) PCT No.: PCT/EP2015/057375
§ 371 (c)(1),
(2) Date: Aug. 10, 2017

(87) PCT Pub. No.: WO2016/155839
PCT Pub. Date: Oct. 6, 2016

(65) Prior Publication Data
US 2018/0048377 A1 Feb. 15, 2018

(51) Int. Cl.
*H04B 7/08* (2006.01)
*H04B 7/0417* (2017.01)
(Continued)

(52) U.S. Cl.
CPC ......... *H04B 7/0885* (2013.01); *H04B 7/0417* (2013.01); *H04L 27/2649* (2013.01);
(Continued)

(58) Field of Classification Search
CPC ............ H04B 7/0885; H04B 7/0417; H04B 27/2649; H04B 1/0475; H04B 2001/0425; H04B 1/525; H04B 2001/0416
See application file for complete search history.

(56) References Cited

U.S. PATENT DOCUMENTS 7,221,918 B1    5/2007  Grasbeck et al.
7,403,508 B1 *  7/2008  Miao ............... H04B 1/692
                                                370/335
(Continued)

FOREIGN PATENT DOCUMENTS

WO    2014067571 A1    5/2014

OTHER PUBLICATIONS

Risi, Chiara et al., "Massive MIMO with 1-bit ADC," Submitted to the IEEE Transactions on Communications, CoRR, Apr. 30, 2014, arXiv:1404.7736v1 [cs.IT], pp. 1-8.
(Continued)

*Primary Examiner* — Kabir A Timory
(74) *Attorney, Agent, or Firm* — Withrow & Terranova, PLLC

(57) ABSTRACT

The present disclosure relates to a wireless communication node comprising at least one array antenna configured to receive a radio signal, said array antenna comprising a plurality of receiving antenna devices, each of said antenna devices being connected to a respective receiving circuit which is configured for processing said radio signal. Each receiving circuit comprises a demodulator, an analog-to-digital converter and a decoder, the demodulator being configured to receive an analog signal from the corresponding receiving antenna device and to output a demodulated analog signal to said analog-to-digital converter which outputs a converted digital signal to the decoder. Furthermore, the node is configured for adding a direct current, DC, offset value to said demodulated analog signal wherein the com-
(Continued)

bined offset values of said node follow a predetermined distribution of values, having a variance, over the analog-to-digital converters.

16 Claims, 4 Drawing Sheets

(51) Int. Cl.
    *H04L 27/26*     (2006.01)
    *H04B 1/06*     (2006.01)
    *H04B 1/16*     (2006.01)
    *H04B 1/30*     (2006.01)

(52) U.S. Cl.
    CPC ............... *H04B 1/06* (2013.01); *H04B 1/16* (2013.01); *H04B 2001/305* (2013.01)

(56) References Cited

U.S. PATENT DOCUMENTS

| | | | |
|---|---|---|---|
| 2008/0025435 A1* | 1/2008 | Yamaguchi | H04L 27/0014 375/298 |
| 2009/0227214 A1* | 9/2009 | Georgantas | H04B 1/30 455/86 |
| 2009/0267816 A1 | 10/2009 | Kumamoto et al. | |
| 2010/0118923 A1 | 5/2010 | Pal | |
| 2012/0075072 A1* | 3/2012 | Pappu | H04B 5/0037 340/10.1 |

OTHER PUBLICATIONS

International Search Report and Written Opinion for International Patent Application No. PCT/EP2015/057375, dated Dec. 10, 2015, 11 pages.
Hoyos, S., et al., "Dithering and ΣΔ Modulation in Mono-bit Digital Receivers for Ultra-Wideband Communications," 2003 IEEE Conference on Ultra Wideband Systems and Technologies, Nov. 16-19, 2003, Reston, Virginia, USA, pp. 71-75.
Mo, J., et al., "Channel Estimation in Millimeter Wave MIMO Systems with One-Bit Quantization," 2014 48th IEEE ASILOMAR Conference on Signals, Systems and Computers, Nov. 2-5, 2014, Pacific Grove, California, USA, pp. 957-961.
Shenghua, Z., et al., "ADC Limitations on the Dynamic Range of a Digital Receiver," 2005 IEEE International Symposium on Microwave, Antenna, Propagation and EMC Technologies for Wireless Communications Proceedings, Aug. 8-12, 2005, Beijing, China, pp. 79-82.
Examination Report for European Patent Application No. 15718155.3, dated Jul. 30, 2018, 8 pages.
Examination Report for European Patent Application No. 15718155.3, dated Nov. 23, 2018, 10 pages.

* cited by examiner

WIRELESS COMMUNICATION NODE AND A METHOD FOR PROCESSING A SIGNAL IN SAID NODE

TECHNICAL FIELD

The present disclosure relates to a wireless communication node comprising at least one array antenna configured to receive a radio signal. The array antenna comprises a plurality of receiving antenna devices, each of said antenna devices being connected to a respective receiving circuit which is configured for processing said radio signal. Each receiving circuit comprises a demodulator, an analog-to-digital converter and a decoder.

The present disclosure also relates to a method for processing a received radio signal in said wireless communication node, and an antenna arrangement.

BACKGROUND

In the field of radio communication, it is previously known to use large array antenna systems. In this regard, the term "array antenna", or, equivalently, "antenna array" refers to a geometrical arrangement of a number of antenna elements. The antenna elements are configured as a single antenna unit to achieve a desired antenna gain and directional characteristics, i.e. a particular radiation pattern. A variation of this radiation pattern is often referred to as beam-forming.

Antenna arrays find applications, e.g., in multiple-input multiple-output (MIMO) communication systems. In this context, very large antenna arrays are often referred to as "massive MIMO arrays". Massive MIMO arrays may use several hundreds of antenna elements arranged in a single antenna unit and are considered to be a key technology component for future communication systems, such as fifth generation, 5G, communication. According to known technology, an up-link MIMO unit may comprise for example a radio base-station receiver, an analog-to-digital converter and automatic gain control units.

Another example of related technology is the so-called ultra-dense network (UDN), which uses the millimeter-wave (mmW) band in order to define a network in which the density is so high that each base station is likely to support a single user, or a very limited number of users. The purpose with such a network is to provide a high capacity, in terms of, e.g. data throughput or data rate, in public places such as airports, shopping malls and similar.

For some or all of the above-mentioned technologies, beam-forming is an important component in order to achieve an intended functionality, such as increased capacity and improved coverage. However, large antenna arrays may then become necessary, having a large number of antenna elements. This creates a need for simple and power-efficient antenna hardware components, in particular in scenarios with high power consumption and high data-rate requirements. Another factor which is also important to consider in terms of power consumption and complexity is the digital-to-analog converters (DAC) and analog-to-digital converters (ADC) which are used in transmitters and receivers, respectively.

In the above-mentioned fields of technology, there is a general requirement to provide communication systems involving array antenna units with low power consumption and low cost. As an example, there is a requirement to use ADCs with a low degree of complexity, with relatively low resolution in terms of bits/sample, and having a low current consumption. An analog-to-digital converter of the single-bit type, i.e. a converter in which only one bit is used for each sample in the converter, fulfills these demands.

However, single-bit converters have limited use, since they can normally only operate in communication systems using low-density modulation of a binary pulse amplitude modulation (PAM) type, or quadrature phase shift keying (QPSK) type, i.e. modulations with signal constellations having at maximum two states in an in-phase (I) dimension and two states in a quadrature (Q) dimension, and cannot be properly used in systems using more complex modulating schemes of higher order, such as, e.g., 16-QAM. Consequently, there exists a contradiction in terms of a need for simple converter solutions (such as the single-bit converter) and the requirements for using complex communication systems with more advanced modulation schemes of higher order.

As a further example, it can be mentioned that a typical previously known massive MIMO receiver structure includes low noise amplifiers, mixers, local oscillator sources, high speed ADCs and automatic gain control (AGC) circuitry. This type of hardware architecture generally supports modulation schemes with much larger density than that of, e.g., QPSK modulation, but at a cost of increased complexity and also often a high power consumption. Such properties of an antenna system are not acceptable in situations with limited output power and/or coverage.

Having the above in mind, there exists a general need to increase the capacity and processing speed of array antenna systems but without increasing the cost, complexity and power consumption of such an array antenna arrangement. In particular, there is a need for using simple, low resolution ADCs within the relevant field of technology.

SUMMARY

It is an object of the present disclosure to provide a method and system, respectively, which fulfill the above-mentioned requirements for increased capacity and speed but generally without any, or limited, increased cost and complexity as compared with prior art.

The object is accomplished by means of a wireless communication node comprising at least one array antenna configured to receive a radio signal, said array antenna comprising a plurality of receiving antenna devices. Each of said antenna devices is connected to a respective receiving circuit which is configured for processing said radio signal. Also, each receiving circuit comprises a demodulator, an analog-to-digital converter and a decoder, the demodulator being configured to receive an analog signal from the corresponding receiving antenna device and to output a demodulated analog signal to said analog-to-digital converter which outputs a converted digital signal to the decoder. Furthermore, said node is configured for adding a direct current, DC, offset value to said demodulated analog signal, wherein the combined offset values of the node follow a predetermined distribution of values, having a variance, over the analog-to-digital converters.

Hereby, use of low resolution ADCs in an antenna array is permitted, despite of the wireless communication system using a higher order modulation scheme. Consequently, high capacity communication is provided without increasing the cost, complexity and power consumption of such an array antenna arrangement.

The object is also obtained by means of a method for processing a received radio signal in a wireless communication node which comprises at least one array antenna configured to receive a radio signal, said array antenna comprising a plurality of receiving antenna devices. The method comprises: receiving said radio signal in a receiving circuit which is connected to each of said antenna devices; demodulating a received analog radio signal in a demodulator and outputting a demodulated analog signal to an analog-to-digital converter; analog-to-digital converting the demodulated signal; and outputting the converted digital signal to a decoder. The method also comprises adding a direct current, DC, offset value to said demodulated analog signal so that the combined offset values of said node follow a predetermined distribution of values, having a variance, over the analog-to-digital converters.

Hereby, as for the wireless communication node, use of low resolution ADCs in an antenna array is permitted, despite of the wireless communication system using a higher order modulation scheme. Consequently, high capacity communication is provided without increasing the cost, complexity and power consumption of such an array antenna arrangement.

The distribution of values is constituted by predetermined stored values or values generated from a random distribution. Hereby, alternatives for generating said DC offset values are provided, allowing for ease of implementation.

Also, according to aspects, the output signal from the demodulator is connected to a corresponding analog-to-digital converter via an adder unit, said adder unit being configured for adding said DC offset to the output signal from the demodulator, or alternatively each analog-to-digital converter is controllable for adding said DC offset by adjusting a threshold level with which an input signal to said analog-to-digital converter is compared.

Thus, the present technique may be implemented in a number of alternative ways, each of which may be particularly suitable for a given architecture. For instance, an existing ADC may already be equipped with means for the above-mentioned threshold level adjustment, in which case this feature can be re-used. If no such possibility exists, the alternative of using an adder unit is an option.

According to an aspect, the values of all DC offsets which are associated with each analog-to-digital converter define a zero mean value.

The feature of defining a zero mean value improves performance in terms of detection performance.

Also, according to an aspect, the analog-to-digital converters are of low resolution type. According to a further aspect, the analog-to-digital converters are of a resolution for which correct analog-to-digital conversion of the signal from the demodulator using a modulation scheme of a given order is not supported by said analog-to-digital converter by itself, without addition of said DC offset values.

The disclosure makes use of the above-mentioned DC offset values as a design parameter of the low-resolution analog-to-digital converters in order to provide successful detection of higher-order modulation formats during communication with the node as described.

Furthermore, the above-mentioned object is also obtained by means of an antenna arrangement comprising a plurality M of receiving antenna devices, each of said antenna devices being connected to a respective receiving circuit which is configured for processing a received radio signal. Each receiving circuit comprises a demodulator, an analog-to-digital converter and a decoder, the demodulator being configured to receive an analog signal from the corresponding receiving antenna device and to output a demodulated analog signal to said analog-to-digital converter which outputs a converted digital signal to the decoder. The arrangement is configured for adding a direct current, DC, offset value to said demodulated analog signal and wherein the combined offset values of said node follow a predetermined distribution of values, having a variance, over the analog-to-digital converters.

An important advantage of the proposed node, method and antenna arrangement is that they enable accurate detection of higher-order modulation formats with a powerful, yet simple and low-cost antenna array circuit which in particular comprises relatively low-resolution analog-to-digital converters.

BRIEF DESCRIPTION OF THE DRAWINGS

Further objects, features, and advantages of the present disclosure will appear from the following detailed description, wherein certain aspects of the disclosure will be described in more detail with reference to the accompanying drawings, in which.

DETAILED DESCRIPTION

Different aspects of the present disclosure will be described more fully hereinafter with reference to the accompanying drawings. The method and apparatus disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Figure 1:
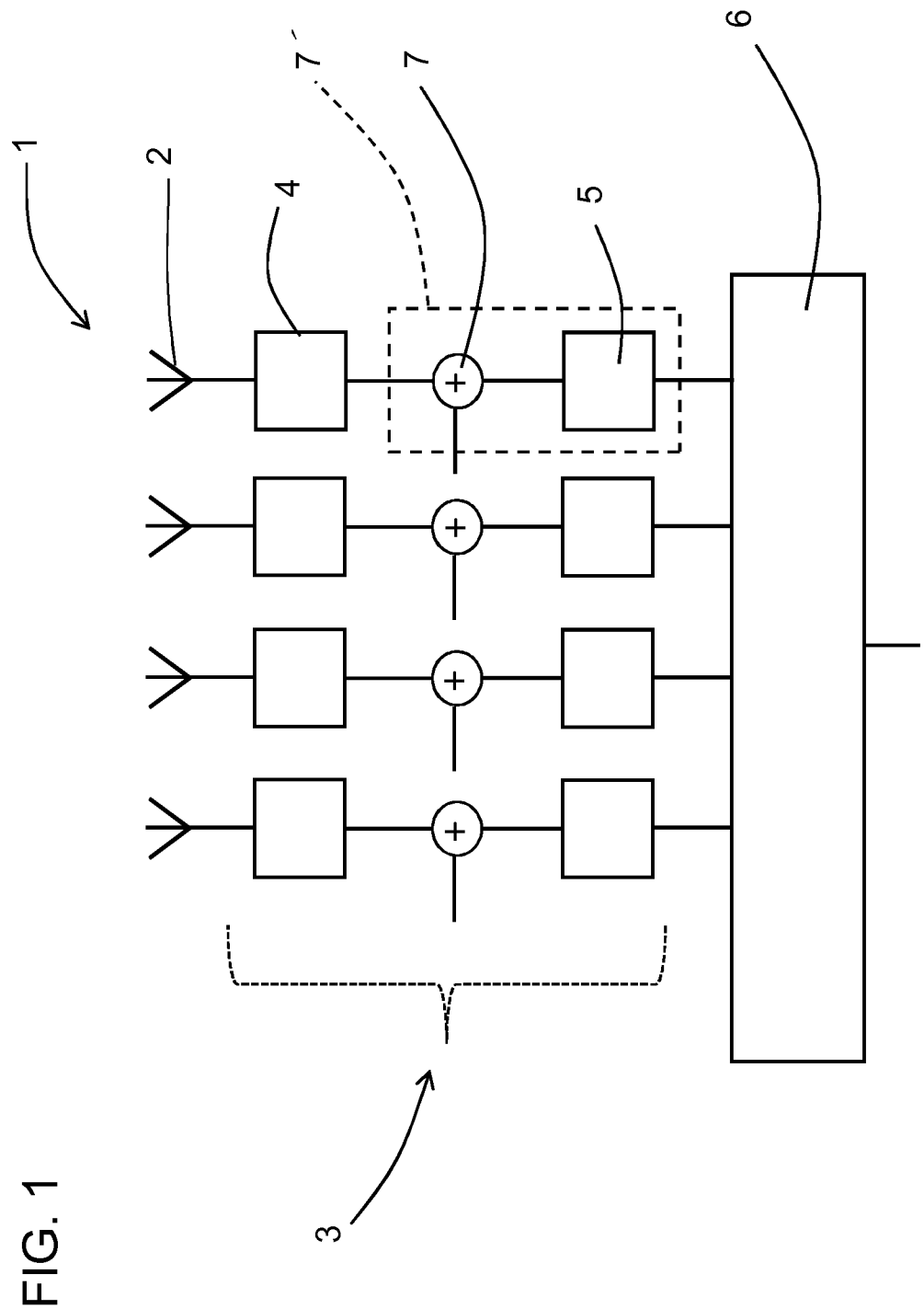
FIG. 1 schematically discloses a wireless communication node in its most general form.

According to a general aspect of the present disclosure, as shown schematically in FIG. 1, there is provided a wireless communication node in the form of an array antenna 1 which comprises a number M of antenna devices 2 for receiving a radio signal. The array antenna 1 is, according to some aspects, also used for transmission of a radio signal, but such aspects will not be covered in detail herein. As mentioned initially, array antennas are previously known as such, and are based on a concept in which a plurality of generally similar antenna devices are used together for forming a single antenna unit having a specified radiation pattern and gain characteristics, the variation of such radiation pattern and gain characteristics being generally referred to as beam-forming.

The array antenna 1 as disclosed comprises a relatively large number M of antenna devices 2, typically at least 100 antenna devices and preferably at least 400 antenna devices which are arranged together as a single unit. The number of antenna devices may vary, and the present disclosure is not intended to be limited to any particular example or any fixed number of antenna devices.

As indicated in FIG. 1, each one of the antenna devices 2 is connected to a receiving circuit 3, which in turn comprises at least the components which are necessary for processing a radio signal which is received by the corresponding antenna device 2. More precisely, the receiving circuit 3 is arranged for receiving and demodulating the received radio signal, and for analog-to-digital conversion of the demodulated radio signal. For this purpose, the antenna device 2 is connected to a demodulator 4, the output of which is connected to an analog-to-digital converter 5. In this manner, the received radio signal is converted into a signal having digital format which is then fed to a decoder 6.

It is a principle of the disclosure that the analog-to-digital converter 5 is of relatively low resolution. According to an aspect, the resolution of said converter 5 is less than 5 bits. According to a further aspect, the analog-to-digital converter 5 is of single-bit type. The purpose of the choice of relatively low resolution is to provide an analog-to-digital converter 1 with a relatively low complexity, low power consumption and low cost. Further issues related to the choice of resolution of the analog-to-digital converter 5 will be explained in greater detail below.

According to some aspects, low resolution, when used in the context of ADCs, is taken to mean a resolution which is not sufficiently high to detect a used modulation when a single antenna element is used in high signal-to-noise (SNR) conditions. Thus, a single-bit ADC is considered to be of low resolution when the modulation used in 16-QAM, but not low resolution if the modulation used in binary PAM.

As mentioned above, it is an aim of the disclosure to provide an array antenna which has increased capacity and speed but no increased cost and power consumption as compared with previously known array antennas. For this reason, it is an important principle of the disclosure that the array antenna 1 as shown in FIG. 1 is configured for adding a DC (i.e. direct current) offset to the demodulated analog signal which defines the output signal from the demodulator 4, i.e. the signal which is to be processed in the analog-to-digital converter 5. According to an aspect shown in FIG. 1, this is obtained by combining the output signal from the demodulator 4 with a DC offset signal provided by means of an adder 7, as indicated in FIG. 1. This is provided for all the receiving circuits 3 which together form the array antenna 1. In this manner, said DC offset is added to the output signal from each demodulator 4 in the array antenna 1.

According to some aspects, there is provided an adder function, in order to add said DC offset signal, by applying an adjustment of a threshold of a comparator (not shown as such) in an analog-to-digital converter. In principle, this provides generally the same function as using a separate adder component. Such an aspect is referred to in FIG. 1 with reference numeral 7', indicating that the adder function and analog-to-digital conversion can be integrated into a single, combined component in the array antenna 1.

It is appreciated that said DC offsets will vary over the different receiving circuits 3, and, according to some aspects, will also vary over time. Hence, despite the reference term "direct current" offset used, the added offset values are not necessarily constant over time.

Furthermore, according to some aspects, the array antenna 1 is configured so that the combined values of all the DC offsets which are added in the manner as described define a distribution of values which is predetermined so as to obtain a certain variance over all the analog-to-digital converters 5. According to some other aspects, the array antenna 1 is configured so that the combined values of all the DC offsets which are added in the manner as described define a distribution of values which is generated as the antenna array is used for communication, i.e., generated on the fly, so as to obtain a certain variance over all the analog-to-digital converters 5. According to all aspects, this means that the DC offset values will vary along all the converters 5 in a controlled manner and with a predetermined variance.

It has been found that by means of an array antenna 1 as disclosed, i.e. being configured so that a DC offset value is applied as described to each demodulated signal, i.e. prior to analog-to-digital conversion, an improved demodulation process can be obtained. More precisely, due to the addition of varying DC offset values in the receiver circuits 3 of the array antenna 1, detection of higher-order modulation schemes in the array antenna 1 will be enabled, i.e. higher order than otherwise would have been possible considering the fact that the analog-to-digital converter 5 is of relatively low resolution. It is here referred to the discussion above on what constitutes a low-resolution ADC.

In other words, the array antenna 1 may operate with more complex, high-order demodulation schemes—which ensures that a communication system using the array antenna 1 can be operated at a high capacity and/or spectral efficiency, in terms of e.g. bits/sec and/or bits/sec/Hz—even though the analog-to-digital converters 5 used in the array antenna 1 are of low-resolution, for example single-bit converters, which cannot by themselves handle such high-order demodulation schemes. By means of the disclosed array antenna 1, a larger set of observable points in a demodulation scheme, after combining on the complex plane, can be created than what have otherwise been possible without the addition of the above-mentioned DC offset values.

As mentioned, the analog-to-digital converter 5 as indicated in FIG. 1 is of the type which has a relatively low resolution, again referring back to the above discussion on what constitutes a low resolution ADC. In the context of the present disclosure, and according to some aspects, the term "low resolution" refers to converters having a resolution of less than 5 bits. A further way of defining the term "low resolution", taking into account the fact that a low resolution converter 5 cannot by itself support a relatively high-order demodulation scheme, is a bit level for which correct analog-to-digital conversion of the signal from the demodulator 4 according to a modulation scheme of a given order is not supported by the converter 5 by itself (i.e. without addition of the DC offset values).

For example, if the analog-to-digital converter 5 shown in FIG. 1 is a single-bit converter, it is a fact that it cannot by itself support demodulation according to a constellation involving 16 phases (or more). For this reason, the single-bit converter 5 can be regarded as being of "low resolution" with regard to a communication system using modulation with 16 phases. However, it has been found that through the addition of the DC offset values as described above, such demodulation constellation can in fact be handled even through the converter 5 is of single-bit type.

As a consequence, an analog-to-digital converter of single-bit type can be regarded as being of "low resolution" for demodulation of radio signals modulated by constellations having more than 2 symbols per dimension, a two-bit analog-to-digital converter is regarded as being of "low resolution" for demodulation constellations having more than 4 symbols per dimension, and so on.

It is appreciated that modulation can be one-dimensional, such as pulse amplitude modulation (PAM), or two-dimensional, such as quadrature amplitude modulation (QAM) using both in-phase (I) and quadrature (Q) components. There are also communication systems using radio signals in more than two dimensions, one example being a system using orthogonal polarizations in addition to I and Q dimensions.

It is furthermore appreciated that one ADC is often applied per dimension in a communication system. Thus, a communication system using a four-dimensional signal constellation often uses four ADCs in order to detect one symbol. The above discussion on low resolution in the context of ADCs apply to communication systems using any number of dimensions.

According to an aspect of this disclosure, the predetermined distribution of DC offset values can be taken from a set of predetermined and stored values, which together define the requested variance. Alternatively, the distribution of DC offset values can be in the form of DC offset values which originate from a random distribution of values. Also, the term "variance" refers to the manner in which the DC offsets are distributed and spread out as regards their actual numerical values. According to an aspect, there is a relatively high variance of the DC offset values, i.e. the values vary considerably from converter 5 to converter of the array antenna 1. The variance may also vary over time or according to some other controlling parameter.

According to a further aspect, the DC offset values can also be randomly chosen before they are added to the demodulated analog signal which defines the output signal from the demodulator 4.

According to an aspect, the combined DC offset values which are associated with each analog-to-digital converter 5 form a zero-mean value as regarded over all the analog-to-digital converters 5 which form part of the array antenna 1. The DC offset values may also vary with a given variance over time.

As mentioned above, a DC offset value is added to the demodulated analog signal which defines the output signal from the demodulator 4 by means of the adder 7. According to a further aspect, the DC offset can also be added in a manner by adjusting a threshold level with which an input signal to said analog-to-digital converter 5 is compared. Consequently, an internal function within each analog-to-digital converter 5 can also be used for controlling the magnitude of the offset DC values according to the principles of this disclosure.

The addition of a DC offset value according to the disclosure must not be confused with a conventional DC calibration of an analog-to-digital converter, wherein a DC offset is applied on an analog-to-digital converter so as to adapt the input signal of the analog-to-digital converter 5 in a proper manner.

According to a further aspect, the actual level of each DC offset value is related to the amplitude, or SNR, of the received radio signal on which it is applied. This means that the amplitude of the DC offset is adapted to the level of the signal being fed to the analog-to-digital converter 5 in order to obtain suitable DC offset values.

Hereby, according to aspects, the peak and average amplitude, or power, or variance, of the DC offsets when taken as a sequence over the ADCs are, according to some aspects, set in relation to the magnitude of the received radio signal. The motivation being that if a too high DC offset is used then the radio signal is potentially swamped, and if a too weak DC offset is used then the DC offset is too low as compared with the received radio signal and has no or little advantageous effect.

One way to determine suitable amplitudes for the DC offset values is by lab experimentation, another is by computer simulation.

The DC offsets, according to some aspects, will have amplitudes, or powers, that are set as a function of the SNR of the received radio signal. Thus, said variance is, according to aspects, chosen in a manner so that it varies with the SNR or received signal strength of the received radio signal.

Figure 2:
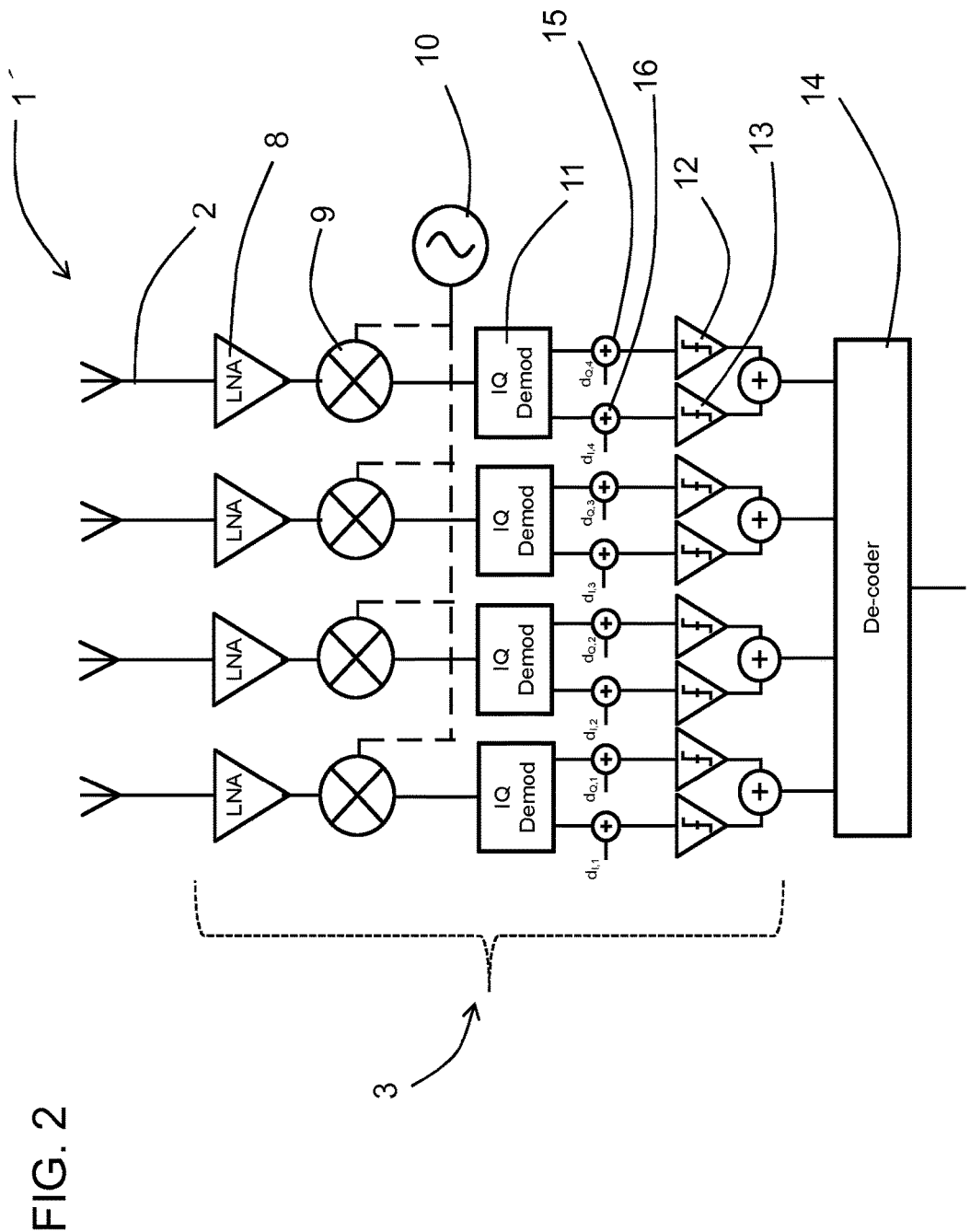
FIG. 2 schematically discloses a wireless communication node according to a further aspect.

According to a further aspect of the present disclosure, as shown schematically in FIG. 2, there is provided a wireless communication node in the form of an array antenna 1" which comprises a number M of antenna devices 2 for receiving a radio signal. In a manner which is similar to the aspect shown in FIG. 1, the array antenna 1" according to FIG. 2 comprises a relatively large number M of antenna devices 2, typically at least 100 antenna devices and preferably at least 400 antenna.

Each of the antenna devices 2 is connected to a receiving circuit 3, which in turn comprises at least those components which are necessary for receiving and processing a radio signal which is received by the antenna device 2. In particular, the receiving circuit 3 is arranged for receiving and demodulating the received radio signal and for analog-to-digital conversion of the received radio signal.

Furthermore, the antenna device 2 as shown in FIG. 2 is connected to a low noise amplifier 8 and further to a mixer 9 which is associated with a local oscillator 10 in a manner which is known as such. The received radio signal is further fed to a demodulator 11 which is configured to demodulate the received analog radio signal from the corresponding antenna device 2. According to this aspect, the demodulator 11 is of the quadrature, or I/Q type, which is a type of demodulator which is previously known as such. In particular, the demodulator 11 is based on the concept that two carrier waves which are 90° out of phase with each other (i.e. two quadrature components) are modulated so as to represent a data signal. This concept is well-known as such and for this reason it is not described in greater detail here.

The demodulator 11 produces two signals, I(t) and Q(t), which together define the demodulated signal. Furthermore, each one of these output signals is fed to a corresponding analog-to-digital converter device 12 and 13, respectively. The sum of the output signals from the two analog-to-digital converters 12, 13 defines a converted digital signal which is then fed to a decoder 14.

In a manner which is similar to that explained with reference to FIG. 1, the analog-to-digital converters 12, 13 are of relatively low resolution. According to an aspect, the resolution is less than 5 bits. According to a further aspect, the analog-to-digital converters 12, 13 is of single-bit type. The same principles regarding the choice of resolution of the converters 12, 13 shown in FIG. 2 are applied as described as above with reference to FIG. 1.

As mentioned initially, it is a general aim to provide an array antenna which has increased capacity and speed but generally less cost than previously known array antennas. For this reason, the aspect shown in FIG. 2 is based on the same principles as described above with reference to FIG. 1, which means that a DC offset value is added to each one of the demodulated analog I/Q signals which are generated by means of the demodulator 11. In order to obtain this, each one of the output signals I/Q from the demodulator 11 is according to an aspect combined, by means of an adder 15, 16, with said DC offset values. The DC offsets are indicated with references $d_{I,n}$ and $d_{Q,n}$ in FIG. 2.

The choice of DC offset values is carried out in a manner which is similar to that explained with reference to FIG. 1, i.e. the array antenna 1" as shown in FIG. 2 is configured for adding a DC (i.e. direct current) offset to the demodulated analog signal which defines the output signal from the demodulator 11. According to an aspect, this is obtained by combining the output signals from the demodulator 11 with signals provided by means of the adders 15, 16 as indicated in FIG. 2. Alternatively, the DC offset can also be added in a manner in which the array antenna 1 is arranged so that each analog-to-digital converter 12, 13 is controllable for adding said DC offset by adjusting a threshold level with which an input signal to said analog-to-digital converter 12, 13 is compared.

The combined values of all the DC offsets which are added in the manner as described define a distribution of values which is predetermined so as to present a given variance over all the analog-to-digital converters 12, 13.

With an array antenna 1' as shown in FIG. 2, i.e. being configured so that a DC offset is applied to each demodulated signal prior to analog-to-digital conversion, an improved demodulation process can be obtained. Due to the addition of varying DC offset values in the receiver circuits 3 of the array antenna 1, detection of more complex and higher-order modulation schemes in the array antenna 1' will be enabled than otherwise would have been possible considering the fact that the analog-to-digital converters 12, 13 are of relatively low resolution. In particular, the disclosure provides advantages since for example single-bit converters 12, 13 can be used to provide a large set of observable points in a demodulation scheme after combining in the complex plane.

According to an aspect, the predetermined distribution of DC offset values can be taken from a set of predetermined and stored values, which together define the requested variance. Alternatively, the distribution of DC offset values can be in the form of DC offset values originating from a random distribution of values. The term "variance" refers to manner in which the DC offsets are distributed and spread out as regards their actual values. The variance may also vary over time or according to some other controlling parameter.

According to aspects, the peak and average amplitude, or power, or variance, of the DC offsets when taken as a sequence over the ADCs are, according to some aspects, set in relation to the magnitude of the received radio signal. The motivation being that if a too high DC offset is used then the radio signal is potentially swamped, and if a too weak DC offset is used then the DC offset is too low as compared with the received radio signal and has no or little advantageous effect.

One way to determine suitable amplitudes for the DC offset values is by lab experimentation, another is by computer simulation.

The DC offsets, according to some aspects, will have amplitudes, or powers, that are set as a function of the SNR of the received radio signal. Thus, said variance is, according to aspects, chosen in a manner so that it varies with the SNR or received signal strength of the received radio signal.

According to an aspect, the above-mentioned variance of the DC offset values can be approximately proportional to the SNR of the radio signal.

Furthermore, the combined DC offset values being associated with each analog-to-digital converter 12, 13 form a zero-mean value as regarded over all the analog-to-digital converters 12, 13 which are forming part of the array antenna 1'. The DC offset values may also vary over time.

The effect provided by the disclosed array antenna 1, as described in FIGS. 1 and 2, can be explained with reference to an example involving a 16QAM modulation scheme. In the case where single-bit analog-to-digital converters are used and there is no noise (and no fading), the symbols in the complex plane will assume one out of only four possible states (QPSK symbols). Consequently, detection of the 16QAM constellation cannot be made. However, if there is noise applied in the form of the DC offset values as described above, the 16QAM points in the constellation which are close to the origin will more likely be mapped to uncorrected QPSK symbols as compared to the outer 16QAM points. When considering an average over many antenna devices 2, these inner points will appear to be closer to the origin than the outer points, effectively allowing recovery of the 16QAM constellation. Consequently, adding the DC offset values provides a way of distinguishing between points of different power in the 16QAM constellation. According to an aspect, the above-mentioned variance of the DC offset values can be approximately proportional to the SNR of the radio signal.

The addition of a DC offset value as explained above and according to FIG. 2 is not the same as a conventional DC calibration of an analog-to-digital converter wherein a DC offset is applied upon an analog-to-digital converter so as to adapt the input signal to the operating range of an analog-to-digital converter.

According to a further aspect, the actual chosen level of each DC offset value is related to the amplitude of the received signal on which it is applied. This means that the amplitude of each DC offset value is adapted to the level of the signal being fed to the analog-to-digital converters 12, 13 in order to obtain correct conversion.

In summary, the essence of the disclosure is to allow for DC-offsets to be introduced in a large set of low resolution data converters—even as low as using a single bit resolution—and in a large scale array antenna. In this manner, detection of higher-order modulation schemes will be enabled, which would otherwise not be supported by the single-bit converter.

Figure 3:
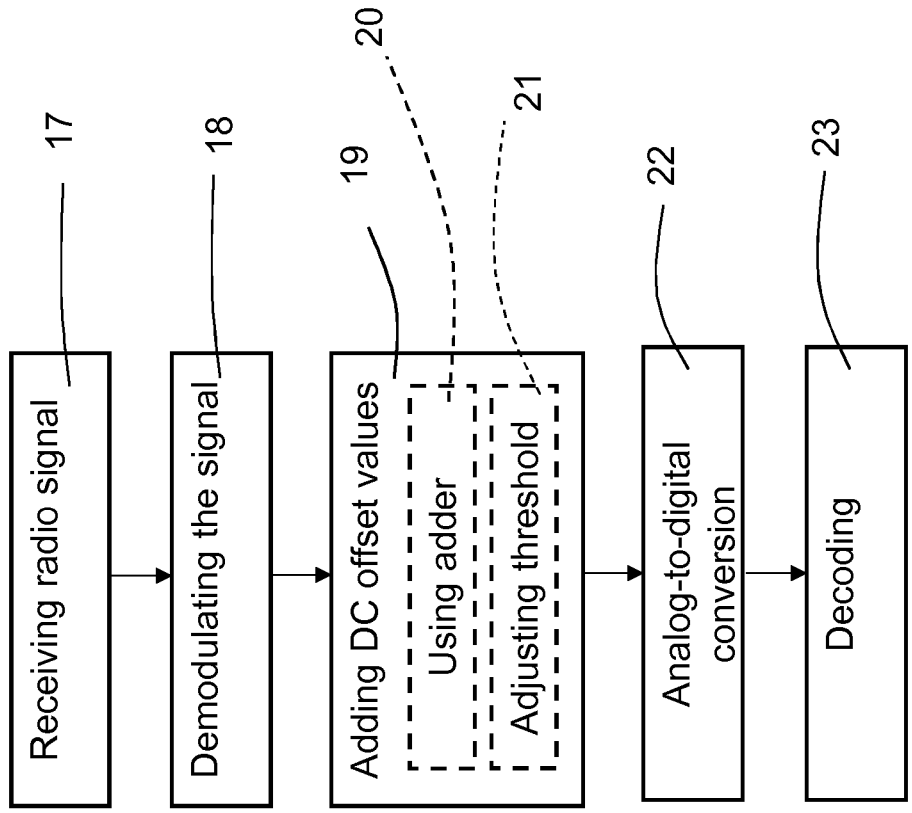
FIG. 3 is a flowchart disclosing a method according to an aspect.

FIG. 3 shows a flowchart of a method according to the present disclosure. As shown in FIG. 3, there is first provided a step of receiving and processing the radio signal as carried out by the antenna device 2, as indicated by means of reference numeral 17 in FIG. 3. Next, a step of demodulating the received signal is carried out (step 18) in a demodulator.

Furthermore, and as described in detail above, addition of a number of DC offset values to the demodulated analog signal is carried out (step 19), wherein the combined offset values of the node in question define a predetermined distribution of values, having a variance, over the analog-to-digital converters mentioned above. As also indicated above with reference to FIGS. 1 and 2, the step of adding the DC offset values can be carried out by means of an adder 7 (see FIG. 1) or 15, 16 (see FIG. 2), as indicated by means of reference numeral 20 in FIG. 3, or alternatively by adjusting a threshold level with which an input signal fed to the analog-to-digital converter is compared, as indicated by means of reference numeral 21 in FIG. 3.

Furthermore, the signal is converted to a digital signal in the analog-to-digital converter (step 22) and finally forwarded to a decoder (step 23).

Figure 4:
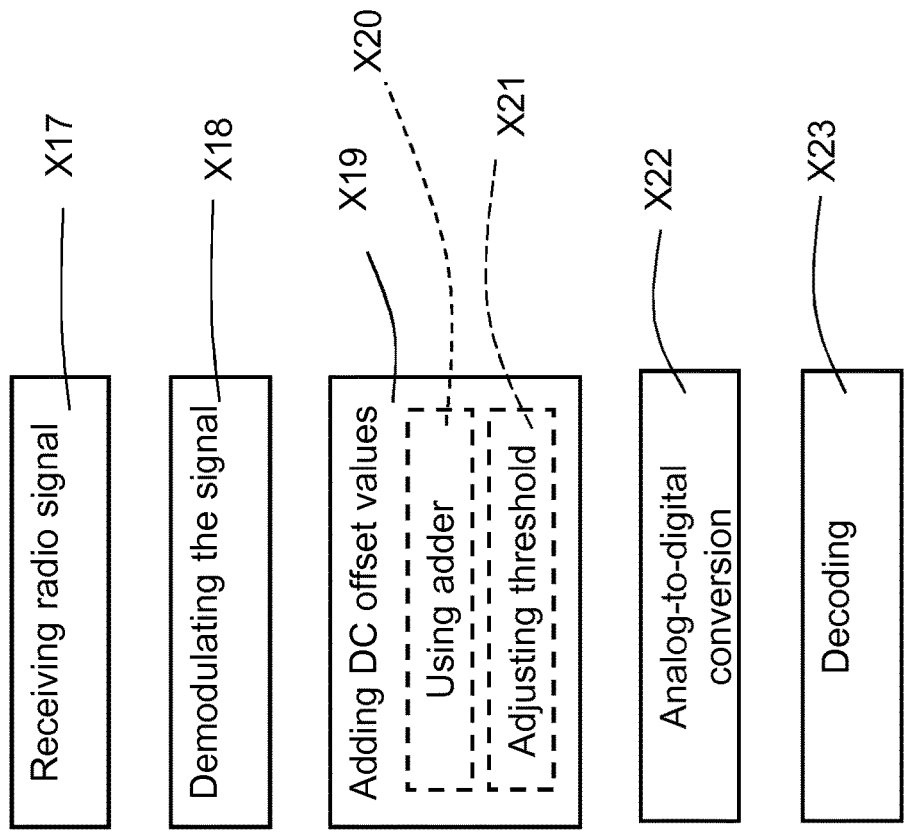
FIG. 4 is an illustration of a wireless communication node according to aspects of the present disclosure.

FIG. 4 shows a wireless communication node comprising at least one array antenna configured to receive a radio signal, said array antenna comprising a plurality of receiving antenna devices, each of said antenna devices being connected to a respective receiving circuit which is configured for processing said radio signal. The communication node comprises the following modules:

a receiving module X15 for receiving and processing the radio signal as carried out by the antenna device (cf. FIGS. 1 and 2);

a demodulator module X18 for demodulating the received signal;

a DC offset adding module X19 in which the addition of a number of DC offset values is applied to the demodulated analog signal, wherein the combined offset values of the node in question define a predetermined distribution of values, having a variance, over the analog-to-digital converters; and wherein the DC offset adding module X19 may use an adder module X20 or alternatively and adjusting module X21 for controlling or otherwise adjusting a threshold level with which an input signal to the analog-to-digital converter is compared; and further an analog-to-digital converter module X22; and a decoder module X23.

Generally, the present disclosure relates to a wireless communication node comprising at least one array antenna 1; 1" configured to receive a radio signal, said array antenna 1; 1" comprising a plurality M of receiving antenna devices 2, each of said antenna devices 2 being connected to a respective receiving circuit 3 which is configured for processing said radio signal, each receiving circuit 3 comprising a demodulator 4; 11, an analog-to-digital converter 5; 12, 13 and a decoder 6; 14, the demodulator 4; 11 being configured to receive an analog signal from the corresponding receiving antenna device 2 and to output a demodulated analog signal to said analog-to-digital converter 5; 12, 13 which outputs a converted digital signal to the decoder 6; 14, wherein said node is configured for adding a direct current, DC, offset value to said demodulated analog signal and wherein the combined offset values of said node follow a predetermined distribution of values, having a variance, over the analog-to-digital converters 5; 12, 13.

According to an example, said predetermined distribution of values is constituted by predetermined stored values or values generated from a random distribution.

According to an example, said variance is selected depending on a signal strength or signal-to-noise ratio of said radio signal, and said variance increases with an increasing signal strength or signal-to-noise ratio, and vice versa.

According to an example, the output signal from the demodulator 4; 11 is connected to a corresponding analog-to-digital converter 5; 12, 13 via an adder unit 7; 15, 16, said adder unit 7; 15, 16 being configured for adding said DC offset to the output signal from the demodulator 4; 11.

According to an example, each analog-to-digital converter 5; 12, 13 is controllable for adding said DC offset by adjusting a threshold level with which an input signal to said analog-to-digital converter 5; 12, 13 is compared.

According to an example, said demodulator 11 has a first output signal I and a second output signal Q, said output signals I, Q being connected to a first analog-to-digital converter 12 and a second analog-to-digital converter 13, respectively; wherein said DC offset values are added to the first output signal I and the second output signal Q.

According to an example, the values of all DC offsets being associated with each analog-to-digital converter 5; 12, 13 define a zero mean value.

According to an example, said receiving circuit 3 comprises an amplifier and a mixer being associated with a local oscillator.

According to an example, said analog-to-digital converters 5; 12, 13 are of low resolution type.

According to an example, said analog-to-digital converters 5; 12, 13 are of a resolution for which correct analog-to-digital conversion of the signal from the demodulator 4; 11 using a modulation scheme of a given order is not supported by said analog-to-digital converter 5; 12, 13 by itself, without addition of said DC offset values.

According to an example, said analog-to-digital converters 5, 6 are of any one of single-bit, one-bit, two-bit, three-bit or four-bit type.

According to an example, the magnitude of the DC offset value is related to the amplitude of the received radio signal.

Furthermore, the present disclosure generally relates to a method for processing a received radio signal in a wireless communication node which comprises at least one array antenna 1 configured to receive a radio signal, said array antenna 1 comprising a plurality M of receiving antenna devices 2; said method comprising:

receiving 17 said radio signal in a receiving circuit 3 which is connected to each of said antenna devices 2;

demodulating 18 a received analog radio signal in a demodulator 4; 11 and outputting a demodulated analog signal to an analog-to-digital converter 5; 12, 13;

analog-to-digital converting 20 the demodulated signal;

outputting 21 the converted digital signal to a decoder 6; 14; and adding 19 a direct current, DC, offset value to said demodulated analog signal so that the combined offset values of said node follow a predetermined distribution of values, having a variance, over the analog-to-digital converters 5; 12, 13.

According to an example, the method comprises:

adding said DC offset to the output signal from the demodulator 4; 11 by means of an adder unit 7; 15, 16.

According to an example, the method comprises:

adding said DC offset to the output signal from the demodulator 4; 11 by adjusting a threshold level with which an input signal to said analog-to-digital converter 5; 12, 13 is compared.

Also, the present disclosure generally relates to a. control unit for processing a received radio signal in an array antenna 1, said control unit being configured to perform the steps of the method as mentioned above.

Also, the disclosure generally relates to an antenna arrangement 1; 1" comprising a plurality (M) of receiving antenna devices 2, each of said antenna devices 2 being connected to a respective receiving circuit 3 which is configured for processing a received radio signal, each receiving circuit 3 comprising a demodulator 4; 11, an analog-to-digital converter 5; 12, 13 and a decoder 6; 14, the demodulator 4; 11 being configured to receive an analog signal from the corresponding receiving antenna device 2 and to output a demodulated analog signal to said analog-to-digital converter 5; 12, 13 which outputs a converted digital signal to the decoder 6; 14, wherein said arrangement 1; 1" is configured for adding a direct current, DC, offset value to said demodulated analog signal and wherein the combined offset values of said node follow a predetermined distribution of values, having a variance, over the analog-to-digital converters 5; 12, 13.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A wireless communication node comprising at least one array antenna configured to receive a radio signal, said at least one array antenna comprising:
a plurality of receiving antenna devices,
each of said plurality of receiving antenna devices being connected to a respective receiving circuit which is configured for processing said radio signal,
each receiving circuit comprising:
a demodulator,
an analog-to-digital converter and
a decoder,
the demodulator being configured to:
receive an analog signal from a corresponding receiving antenna device and
to output a demodulated analog signal to said analog-to-digital converter which outputs a converted digital signal to the decoder,
wherein said wireless communication node is configured for adding a direct current, DC, offset value to said demodulated analog signal and
wherein each of the DC offset values for the plurality of receiving circuits are separate and combined offset values of said wireless communication node follow a predetermined distribution of values, having a variance, over the analog-to-digital converters.

2. The communication node according to claim 1, wherein said predetermined distribution of values is constituted by predetermined stored values or values generated from a random distribution.

3. The communication node according to claim 1, wherein said variance is selected depending on a signal strength or signal-to-noise ratio of said radio signal, and wherein said variance increases with an increasing signal strength or signal-to-noise ratio, and vice versa.

4. The communication node according to claim 1, wherein an output signal from the demodulator is connected to a corresponding analog-to-digital converter via an adder unit, said adder unit being configured for adding said DC offset value to the output signal from the demodulator.

5. The communication node according to claim 1, wherein each analog-to-digital converter is controllable for adding said DC offset value by adjusting a threshold level with which an input signal to said analog-to-digital converter is compared.

6. The communication node according to claim 1, said demodulator having a first output signal and a second output signal, said first and second output signals being connected to a first analog-to-digital converter and a second analog-to-digital converter, respectively; wherein DC offset values are added to the first output signal and the second output signal.

7. The communication node according to claim 1, wherein values of all DC offset values being associated with each analog-to-digital converter define a zero mean value.

8. The communication node according to claim 1, wherein said receiving circuit comprises an amplifier and a mixer being associated with a local oscillator.

9. The communication node according to claim 1, wherein said analog-to-digital converters are of low resolution type.

10. The communication node according to claim 9, wherein said analog-to-digital converters are of a resolution for which correct analog-to-digital conversion of a signal from the demodulator using a modulation scheme of a given order is not supported by said analog-to-digital converter by itself, without addition of DC offset values.

11. The communication node according to claim 9, wherein said analog-to-digital converters are of any one of single-bit, one-bit, two-bit, three-bit or four-bit type.

12. The communication node according to claim 1, wherein a magnitude of the DC offset value is related to an amplitude of the received radio signal.

13. A method for processing a received radio signal in a wireless communication node which comprises at least one array antenna configured to receive a radio signal, said at least one array antenna comprising a plurality of receiving antenna devices; said method comprising:
receiving said radio signal in a receiving circuit which is connected to each of said plurality of receiving antenna devices;
demodulating a received analog radio signal in a demodulator and outputting a demodulated analog signal to an analog-to-digital converter;
analog-to-digital converting the demodulated signal;
outputting the converted digital signal to a decoder; and
adding a direct current, DC, offset value to said demodulated analog signal so that combined offset values of said wireless communication node follow a predetermined distribution of values, having a variance, over the analog-to-digital converter.

14. The method according to claim 13, further comprising:
adding said DC offset value to an output signal from the demodulator by means of an adder unit.

15. The method according to claim 13, further comprising:
adding said DC offset value to an output signal from the demodulator by adjusting a threshold level with which an input signal to said analog-to-digital converter is compared.

16. An antenna arrangement comprising:
a plurality of receiving antenna devices,
each of said plurality of receiving antenna devices being connected to a respective receiving circuit which is configured for processing a received radio signal,
each receiving circuit comprising:
a demodulator,
an analog-to-digital converter and
a decoder,
the demodulator being configured to:
receive an analog signal from a corresponding receiving antenna device and to output a demodulated analog signal to said analog-to-digital converter which outputs a converted digital signal to the decoder,
wherein said antenna arrangement is configured for adding a direct current, DC, offset value to said demodulated analog signal and
wherein each of the DC offset values for the plurality of receiving circuits are separate and combined offset values of said antenna arrangement follow a predetermined distribution of values, having a variance, over the analog-to-digital converters.

\* \* \* \* \*